UNITED STATES PATENT OFFICE.

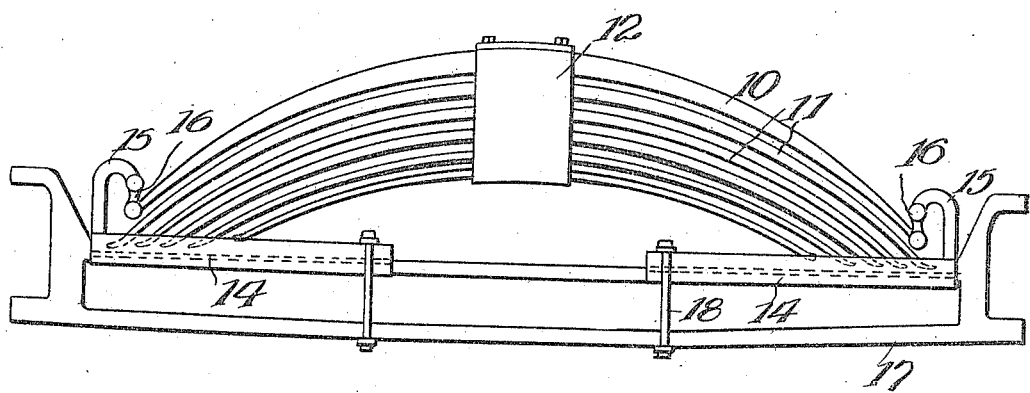
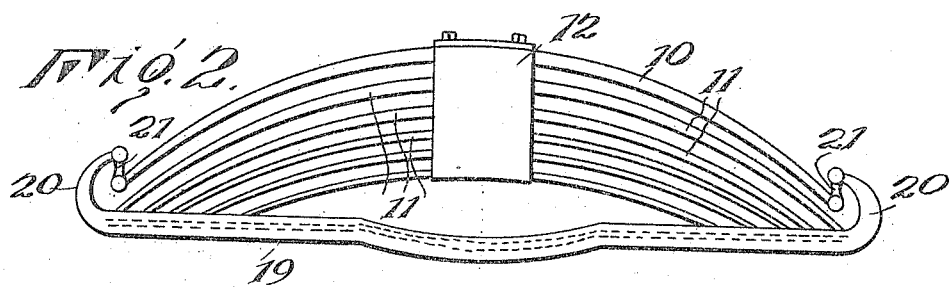
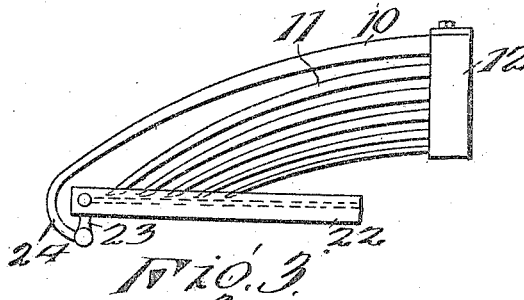
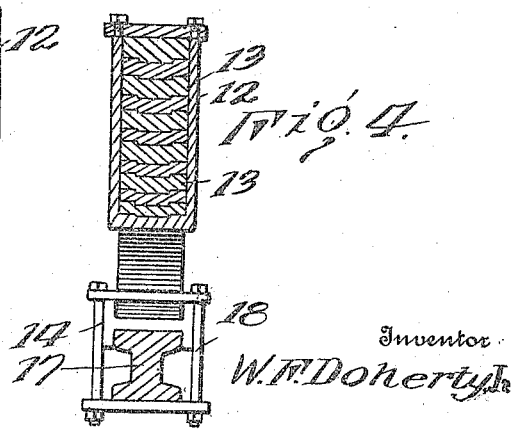

WILLIAM F. DOHERTY, JR., OF BISBEE, ARIZONA.

VEHICLE-SPRING.

1,233,762. Specification of Letters Patent. Patented July 17, 1917.

Original application filed March 3, 1916, Serial No. 81,893. Divided and this application filed August 21, 1916. Serial No. 116,141.

*To all whom it may concern:*

Be it known that I, WILLIAM F. DOHERTY, Jr., a citizen of the United States, residing at Bisbee, in the county of Cochise and State of Arizona, have invented certain new and useful Improvements in Vehicle-Springs, of which the following is a specification.

This invention relates to vehicle springs and constitutes a division of my pending application for a similar invention, filed March 3, 1916, Serial No. 81,893.

The invention has as its primary object to provide a spring which may be readily connected to substantially any conventional type of vehicle axle to coöperate therewith for cushioning the load.

The invention has as a further object to provide a spring having a body bar adapted to overlie the vehicle axle to be connected thereto with the leaves of the spring mounted to individually coöperate with the said bar when compressed by the load.

And a still further object of the invention is to provide a spring having the supplemental leaves thereof free with respect to each other with the said leaves adapted to successively coöperate with the body bar for cushioning the load as the weight of the load is increased.

Other and incidental objects will appear as the description proceeds and in the drawings wherein I have illustrated the preferred embodiment of the invention and wherein similar reference characters designate corresponding parts throughout the several views:

Figure 1 is a front elevation of my improved vehicle spring showing the body bar of the spring connected to a conventional type of vehicle axle, Fig. 2 is a similar view showing a slight modification and illustrating a vehicle axle formed to directly receive the spring, Fig. 3 is a fragmentary front elevation showing a still further modification and illustrating the master leaf of the spring slung beneath the body bar, and Fig. 4 is a sectional view more particularly showing the mounting of the spring leaves and the manner in which the body bar is formed to overlie the vehicle axle.

In carrying out the invention, the spring is constructed in semi-elliptic form and includes a master leaf 10 and a plurality of supplemental leaves 11. The leaves 10 and 11 are longitudinally bowed and each tapered toward opposite ends thereof with the said leaves graduated in length and thickness from the master leaf to the innermost supplemental leaf, the master leaf being substantially the longest and thickest while each succeeding inwardly disposed leaf is slightly shorter and is of slightly less thickness. Connecting the several leaves of the spring is a substantially U-shaped yoke or clip 12 and received within this clip are a plurality of spacer blocks 13 arranged between the leaves 10 and 11. The leaves and the blocks are provided with mating ribs and sockets, as particularly shown in Fig. 4 of the drawings for holding the blocks against displacement as well as for holding the supplemental leaves against longitudinal shifting movement with respect to the clip and it will be observed that the blocks 13 are graduated in thickness from the master leaf toward the innermost supplemental leaf, so that the spacing between adjacent leaves of the spring is reduced toward the innermost supplemental leaf.

Arranged to coöperate with the leaves of the spring is a chordal body bar which is formed of sections 14 upon the outer extremities of which are arranged the upstanding brackets 15. The brackets 15, at their upper extremities, curve inwardly toward each other and pivotally receive links 16 having pivotal connection with the ends of the master leaf 10 of the spring and swingingly supporting the spring upon the body bar. The body bar is, as particularly shown in Fig. 4 of the drawings, in the nature of an I-beam, and the extremities of the supplemental leaves 11 are received within the uppermost channel of the said bar to coöperate therewith with the side walls of the said channel adapted to hold the ends of the said leaves against lateral displacement. Preferably, the ends of the supplemental leaves are deflected longitudinally to provide lugs or bearing portions adapted to engage within the said channel.

The spring, as thus constructed, is designed for connection to a vehicle axle in the manner shown in Fig. 1 of the drawings. The axle is conventionally shown at 17 and it will be observed, as illustrated in Fig. 4 of the drawings, that the said axle is received within the lowermost channel of the body bar of the spring with the said body bar overlying the axle. Connecting the free extremities of the sections of the said bar with the axle, are clips or other suitable fastening devices 18. Thus, it will be seen that my improved spring may be readily connected to substantially any conventional type of vehicle axle and, of course, the body of the vehicle is to be suitably attached to the spring at the clip 12 with the said vehicle body bearing over the clip.

Preferably, the master leaf 10 will possess sufficient rigidity to normally support the weight of the vehicle body with the ends of the supplemental leaves 11 spaced from the body bar 14. Then, as the load is increased to necessitate a corresponding increase in the rigidity of the spring to support the load with equal resiliency, the supplemental leaves will be moved to successively engage the body bar as the master leaf is flattened and will coact with the said bar to increase the rigidity of the spring in direct proportion to the increase in the weight of the load. Since the leaves of the spring are graduated in length and thickness, as previously described, and the spacing between the said leaves is also graduated, the supplemental leaves upon being moved to coöperate with the body bar, will successively coact with the master leaf and with each other to gradually absorb the weight of the load without jars or jerks.

In Fig. 2 of the drawings, I have illustrated a slight modification of the invention wherein the spring is attached directly to the vehicle axle. In this modification, the vehicle axle is shown at 19 and is provided upon its upper side with a suitable channel with the said axle forming the body bar of the spring. At its extremities, the axle is formed with upstanding brackets 20 similar to the brackets 15 of the preferred form of the invention. These brackets, at their free extremities, curve inwardly to pivotally receive links 21 swingingly connected to the ends of the master leaf 10 of the spring with the said brackets supporting the supplemental spring leaves 11 to project at their ends within the channel in the upper side of the axle. Otherwise, the spring of this modification is constructed in accordance with the preferred form of the invention and operates in a similar manner. It will be seen that the preferred construction provides an arrangement which may be employed in connection with vehicles as now in use while the construction of the modification may be embodied in vehicles during the process of manufacture.

In Fig. 3 of the drawings, I have shown the manner in which the master leaf of the spring may be swung beneath the body bar. In this modification, the body bar is indicated at 22. Pivotally connected to the outer extremity of the said bar are suitable links, one of which is shown at 23. These links are arranged to depend beneath the bar and the extremities of the master spring leaf are extended and curved around the ends of the bar as shown at 24 to be pivotally connected to the said links. This mounting of the spring may, in some instances, be found desirable and since this modification is otherwise constructed in accordance with the preferred form of the invention, a further description thereof will not be given.

Having thus described the invention, what is claimed as new is:

1. A vehicle spring including a rigidly supported body bar, bracket arms carried thereby, a master leaf connected to said bracket arms, and a supplemental leaf associated with the master leaf and free at its extremities, the said supplemental leaf being supported in spaced relation to the master leaf and to the body bar and being movable to engage at its free extremities with the body bar to coöperate with the master leaf in supporting a load.

2. A vehicle spring including a body bar, upstanding brackets carried thereby, a master leaf connected to the said brackets, and a supplemental leaf supported in spaced relation to the master leaf and of less thickness than the said master leaf, the supplemental leaf being arranged to engage the body bar to coöperate with the master leaf in supporting a load.

3. A vehicle spring including a sectional body bar, a master leaf operatively connected at its extremities to the said sections, a supplemental leaf associated with the master leaf and movable to engage at its extremities with the said bar sections to coöperate with the master leaf in supporting a load, the sections of the body bar being adapted to overlie a vehicle axle to be supported thereby in active position, and means for clamping the said sections in such position.

4. A vehicle spring including a body bar provided with a channel, brackets carried by the said bar, a master leaf carried by the said brackets, and a supplemental leaf connected with the master leaf, the extremities of said supplemental leaf being received within the said channel and arranged to engage the body bar to coöperate with the master leaf in supporting a load.

5. The combination with a vehicle axle, of a vehicle body spring therefor, the said spring including a body bar formed to overlie the vehicle axle, means connecting said bar with the said axle, a master leaf connected with the said bar, and a supplemental leaf associated with the master leaf and movable upon the flattening of the master leaf to engage the said bar to coöperate with the master leaf in supporting a load.

6. A vehicle spring including a rigidly supported body bar, brackets carried thereby, a master leaf connected to said brackets, and a plurality of supplemental leaves of graduated length associated with said master leaf and supported in spaced relation thereto and to each other, the said supplemental leaves being movable under the weight of a load upon the master leaf to successively engage the body bar beginning with the outermost supplemental leaf.

7. The combination with a vehicle axle, of a vehicle body spring therefor, said spring including brackets upstanding from the axle, a master leaf connected to said brackets, and a supplemental leaf associated with the master leaf and having free extremities spaced from the axle, the supplemental leaf being movable to engage at its extremities with the axle under the weight of a load upon the master leaf.

In testimony whereof I affix my signature.

WILLIAM F. DOHERTY, Jr. [L. S.]

Copies of this patent may be obtained for five cents each, by addressing the "Commissioner of Patents, Washington, D. C."